(12) United States Patent
Heldwein et al.

(10) Patent No.: US 8,020,838 B2
(45) Date of Patent: Sep. 20, 2011

(54) CONTACTING STAGES FOR CO-CURRENT CONTACTING APPARATUSES

(75) Inventors: Thomas C. Heldwein, Pendleton, NY (US); Joseph Agnello, Grand Island, NY (US); Aaron J. Muck, Clarence, NY (US); Zhanping Xu, East Amherst, NY (US); Brian J. Nowak, Orchard Park, NY (US)

(73) Assignee: UOP LLC, Des Plaines, IL (US)

(*) Notice: Subject to any disclaimer, the term of this patent is extended or adjusted under 35 U.S.C. 154(b) by 413 days.

(21) Appl. No.: 12/414,924

(22) Filed: Mar. 31, 2009

(65) Prior Publication Data

US 2010/0242730 A1    Sep. 30, 2010

(51) Int. Cl.
  *B01D 3/22* (2006.01)
  *B01F 3/04* (2006.01)
(52) U.S. Cl. ............ 261/114.5; 96/189; 96/296; 96/300
(58) Field of Classification Search .............. 96/189, 96/296, 299, 300; 261/100, 108, 114.1, 114.5; 202/158
See application file for complete search history.

(56) References Cited

U.S. PATENT DOCUMENTS

| | | | | |
|---|---|---|---|---|
| 2,210,808 A | * | 8/1940 | Glitsch | 261/114.2 |
| 2,936,406 A | * | 5/1960 | Du Val, Jr. et al. | 361/729 |
| 3,759,497 A | * | 9/1973 | Black | 261/113 |
| 5,573,714 A | * | 11/1996 | Monkelbaan et al. | 261/114.5 |
| 5,837,105 A | | 11/1998 | Stober et al. | 203/40 |
| 6,059,934 A | | 5/2000 | Stober et al. | 203/40 |
| 6,575,438 B2 | | 6/2003 | Nutter et al. | 261/114.1 |
| 6,682,633 B1 | | 1/2004 | Xu et al. | 203/1 |
| 6,755,948 B1 | * | 6/2004 | Fukuyo et al. | 204/298.13 |
| 7,004,988 B2 | | 2/2006 | Letzel | 55/444 |
| 7,125,005 B2 | * | 10/2006 | Colic et al. | 261/114.1 |
| 7,137,622 B2 | | 11/2006 | Buchanan | 261/114.1 |
| 7,276,215 B2 | | 10/2007 | Muller | 422/224 |
| 7,370,846 B2 | | 5/2008 | Xu et al. | 261/114.1 |
| 7,424,999 B2 | | 9/2008 | Xu et al. | 261/97 |
| 7,931,871 B2 | * | 4/2011 | Nascimento et al. | 422/129 |
| 2004/0099970 A1 | * | 5/2004 | Zich et al. | 261/114.5 |
| 2004/0207103 A1 | * | 10/2004 | Colic et al. | 261/114.1 |
| 2007/0040289 A1 | | 2/2007 | Pilling et al. | 261/114.4 |
| 2007/0137482 A1 | | 6/2007 | Xu et al. | 95/198 |

OTHER PUBLICATIONS

Zhanping Xu et al., "SimulFlow™ device—capacity beyond system limit," UOP LLC, 175 E. Park Dr., Tonawanda, NY 14150 and UOP LLC, 13105 Northwest Freeway, Suite 600, Houston, TX 77040-6312 [Abstract only].

Zhanping Xu et al., "High capacity co-current flow distillation internals," UOP LLC, 175 E. Park Dr., Tonawanda, NY 14150 and UOP LLC, 25 E. Algonquin Rd., Des Plaines, IL 60017-5017, *AIChE Annual Meeting*, Paper 272d, slide presentation (Nov. 6, 2007).

(Continued)

*Primary Examiner* — Frank Lawrence, Jr.
(74) *Attorney, Agent, or Firm* — Mark Goldberg (57) ABSTRACT

Improved contacting stages for carrying out vapor-liquid contacting are described. Particular aspects are directed to co-current vapor-liquid contacting devices with non-parallel contacting stages that provide an efficient usage of column space for fluid flow and contacting, in order to achieve high capacity, high efficiency, and low pressure drop. The fabrication of such contacting stages is improved using one or more structural enhancements, preferably a combination of enhancements, to achieve easy installation and significantly improved rigidity between the various parts and thereby avoid movement/separation of these parts. This reduces the possibility of fluid leakage across, and consequently vapor and/or liquid bypassing of, the contacting stage.

20 Claims, 8 Drawing Sheets

OTHER PUBLICATIONS

Christensen, G. et al., "Cocurrent downflow of air and water in a two-dimensional packed column," *AIChE Journal*, v 32, n. 10, Oct. 1986, pp. 1677-1689.

Seigel, M.H. et al, "Air-lift reactor analysis: interrelationships between riser, downcomer, and gas-liquid separator behavior, including gas recirculation effects," John Wiley and Sons, *AIChE Journal* (ISSN 0001-1541), v 32, n. 10, Oct. 1986, pp. 1585-1596.

Maiti, R.N. et al., "Gas-liquid distributors for trickle-bed reactors: a review," *Industrial and Engineering Chemistry Research* 46(19) 2007, pp. 6164-6182, American Chemical Society.

Trutna, W., "Cocurrent contactor raises [distillation] column throughout," University of Texas Center for Energy Studies; *Chemical Engineering* (ISSN 0009-2460), v 98, n. 2, pp. 19-20 Chemical Week Associates (Feb. 1991).

Boniface, A., "(Distilation liquid and vapor) distributors," *The Chemical Engineer* (ISSN 0302-0797), n. 469, pp. 19, 21, 23-24 (Feb. 1990).

Bolles, W. L., "Multipass flow distribution and mass transfer efficiency for distillation plates," Monsanto Company, *AIChE Journal*, v. 22, Issue 1, pp. 153-158 (Jun. 17, 2004).

Tedder, W. D. et al., "Improving hydraulics and efficiencies with the T-By sieve tray," School of Chemical Engineering, Georgia Institute of Technology, Atlanta, Georgia, *AIChE Journal*, v. 39, Issue 4, pp. 569-580 (Jun. 17, 2004).

\* cited by examiner

CONTACTING STAGES FOR CO-CURRENT CONTACTING APPARATUSES

FIELD OF THE INVENTION

The invention relates to contacting stages for apparatuses for performing vapor-liquid contacting such as in fractional distillation or other mass and/or heat transfer operations. The invention more specifically relates to improvements in the construction of such contacting stages for better structural integrity and ease of installation.

DESCRIPTION OF RELATED ART

Vapor-liquid contacting devices, such as fractionation trays and packings, are employed to perform a wide variety of separations, particularly in the petroleum and petrochemical industries. Fractionation trays, for example, are used for separating hydrocarbons into fractions having a similar relative volatility or boiling point. These fractions include crude oil-derived products of petroleum refining and petrochemical processing, such as naphtha, diesel fuel, LPG, and polymers. In some cases, trays are used to separate specific compounds from others of the same chemical or functional class, for example alcohols, ethers, alkylaromatics, monomers, solvents, inorganic compounds, etc. Trays are also used in gas processing and absorptive separation operations. A wide variety of trays and other contacting devices having differing advantages and drawbacks have been developed.

Fractionation trays and packings are the predominant forms of conventional vapor-liquid contacting devices used in distillation apparatuses, for example, in the applications described above. In the case of trays, a typical fractionation column will utilize about 10 to 250 of these contacting devices, depending on the ease of the separation (relative volatility difference) and desired product purity. Often the structure of each tray in the column is similar, but it is also known that the structures may differ (e.g., alternate) with respect to vertically adjacent trays. Trays are mounted horizontally, normally at a uniform vertical distance with respect to adjacent trays, referred to as the tray spacing of the column. This distance, however, may vary in different sections of the column. The trays are often supported by rings welded to the inner surface of the column wall.

Fractional distillation has traditionally been conducted in cross flow or counter current contacting devices having an overall downward liquid flow and upward vapor flow. At some point in the apparatus the vapor and liquid phases are brought into contact to allow the vapor and liquid phases to exchange components and achieve, or approach as closely as possible, vapor-liquid equilibrium with each other. The vapor and liquid are then separated, moved in their respective directions, and contacted again with another quantity of the appropriate fluid at a different stage. In many conventional vapor-liquid contacting devices, vapor and liquid are contacted in a cross flow arrangement at each stage. An alternative apparatus differs from traditional multi-stage contacting systems in that while the overall flow in the apparatus continues to be countercurrent, each stage of actual contacting between the liquid and vapor phases is at least partially performed in a co-current mass transfer zone.

During fractional distillation processes using conventional trays, vapor generated at the bottom of the column rises through a large number of small perforations spread over the decking area of the tray, which supports a quantity of liquid. The passage of the vapor through the liquid generates a layer of bubbles referred to as froth. The high surface area of the froth helps to establish a compositional equilibrium between the vapor and liquid phases on the tray. The froth is then allowed to separate into vapor and liquid. During vapor-liquid contacting, the vapor loses less volatile material to the liquid and thus becomes slightly more volatile as it passes upward through each tray. Simultaneously the concentration of less volatile compounds in the liquid increases as the liquid moves downward from tray to tray. The liquid separates from the froth and travels downward to the next lower tray. This continuous froth formation and vapor-liquid separation is performed on each tray. Vapor-liquid contacting devices therefore perform the two functions of contacting the rising vapor with liquid and then allowing the two phases to separate and flow in different directions. When the steps are performed a suitable number of times on different trays, multiple equilibrium stages of separation can be achieved, leading to the effective separation of chemical compounds based upon their relative volatility.

Many different types of vapor-liquid contacting devices including packings and trays have been developed in an effort improve such separations. Different devices tend to have different advantages. For instance, multiple downcomer trays have high vapor and liquid capacities and the ability to function effectively over a significant range of operating rates. Structured packings tend to have a low pressure drop, making them useful in low pressure or vacuum operations. Perforated decks are efficient contacting devices, but can cause high pressure drop in a column, especially when used in a relatively small deck area, even if the fractional open area is high. Two important parameters used to evaluate the performance of any vapor-liquid contacting device are capacity and efficiency. Both of these, however, may be compromised if maldistribution of liquid or vapor occurs in a vapor-liquid contacting apparatus. Maldistribution of liquid or vapor has a tendency to propagate from one stage to the next, reducing the capacity and efficiency of the apparatus as a whole.

Particular examples of known vapor-liquid contacting devices include, for example, those described in U.S. Pat. No. 6,682,633 for co-current contacting of vapor and liquid in a number of structural units which are placed in horizontal layers. U.S. Pat. No. 5,837,105 and related U.S. Pat. No. 6,059,934 disclose a fractionation tray having multiple co-current contacting sections spread across the tray.

Other devices and apparatuses incorporating these devices, which address the issues discussed above and other considerations, are described in U.S. Pat. No. 7,424,999, hereby incorporated by reference. These devices are contacting modules in horizontal stages and differ from a conventional tray-like construction. The modules of one stage are rotated to be non-parallel with respect to the modules of an inferior stage, a superior stage, or both. The contacting modules include at least a liquid distributor (or downcomer) and a vapor-liquid separator (or demister) which together define a contacting volume, namely a co-current flow channel. Ascending vapor enters the contacting volume and entrains liquid that is discharged from the liquid distributor. The ascending vapor and entrained liquid are carried co-currently in the contacting volume to the demister, which partitions or separates the vapor and liquid such that these streams can separately flow upward and downward, respectively, after contact. Liquid exiting the demister flows onto a receiving pan and is then directed downward through a duct. Each of the ducts associated with a single receiving pan direct the liquid into a separate downcomer of an inferior contacting stage. Vapor exiting the demister flows to a fluid transfer volume above the receiving pan and then into the contacting volume of a superior contacting stage.

The demisters and downcomers between them therefore cooperate to form one or more co-current contacting modules of a given contacting stage. These demisters and downcomers are generally elongated structures that extend across portions of a particular cross section, usually circular, of a vapor-liquid contacting apparatus. For a given contacting stage, the co-current contacting modules, together with receiving pans separating these modules, are normally arranged to cover the entire cross section. Fabrication of these contacting stages therefore involves a number of considerations associated with ease of installation, standardized construction of the parts, and sufficient structural integrity to avoid movement and/or separation between parts over the course of service under varying temperatures and pressures. Improvements in contacting stages such as these, especially with respect to their fabrication and installation, are continually being sought.

SUMMARY OF THE INVENTION

The present invention is associated with the discovery of improved contacting stages, which include one or more individual, co-current contacting modules, for carrying out vapor-liquid contacting. Co-current contacting modules of particular interest are those in which (i) downwardly flowing liquid, exiting a downcomer that receives liquid from a duct of a receiving pan of a superior stage, and (ii) upwardly flowing vapor, exiting a demister outlet of an inferior stage, are both discharged into co-current flow channels. The invention therefore applies to co-current vapor-liquid contacting devices with non-parallel stages and structures for transferring liquid from one stage to the next inferior stage without reducing liquid handling capability. Such devices provide an efficient usage of column space for fluid flow and contacting, in order to achieve high capacity, high efficiency, and low pressure drop.

The fabrication of such contacting stages is improved using one or more structural enhancements, preferably a combination of enhancements, to achieve significantly improved rigidity between the various parts and thereby avoid movement/separation of these parts. This reduces the possibility of fluid leakage across, and consequently vapor and/or liquid bypassing of, the contacting stage, which can ultimately reduce the efficiency of the vapor-liquid separation that a given co-current contacting apparatus is designed to achieve. Particular aspects of the invention pertain to the manner in which parts of the contacting stage, including the demisters, downcomers, and receiving pans, are installed and/or secured. Significant benefits in the installation and the resulting structural integrity of contacting stages, as described herein, can result from a number of structural enhancements acting in combination.

Aspects of the invention therefore relate to high capacity and high efficiency co-current vapor-liquid contacting apparatuses for use in fractionation columns and other vapor-liquid contacting processes. Such apparatuses generally comprise a plurality of contacting stages, each comprising a number of parts or elements that must be fabricated such that they can be installed in a confined space, for example in a cylindrical vessel of a contacting apparatus, and in a secure manner covering a cross section of the vessel. The invention is therefore broadly directed to improved contacting stages for co-current contacting apparatuses, in which the downcomers, demisters, and receiving pans are secured in a sealing or substantially sealing manner that minimizes or prevents bypassing, or passage of vapor and/or liquid across the contacting stage without contact between these two phases.

According to one embodiment, the present invention is directed to a contacting stage for an apparatus for performing co-current vapor-liquid contacting. The contacting stage comprises a pair of demister rows being spaced apart and comprising a plurality of individual demister units having connecting flanges extending above top surfaces of the demister units. The contacting stage further comprises a pair of receiving pans on alternate sides of the spaced apart demister rows, with a receiving pan on a side of each demister row that is opposite the side adjacent the space through which a common downcomer extends. The downcomer extends between the spaced apart demister rows and defines, with inlet surfaces of the demister units, a pair of co-current flow channels, each being on an opposite side of the downcomer. The outlet of the downcomer is normally positioned centrally between, and/or in fluid communication with both of, the co-current flow channels.

In a representative embodiment, all demister units of the same demister row (of the pair of demister rows) have outlet surfaces superior to the same receiving pan (of the pair of receiving pans). Similarly, the inlet surfaces of all demister units of the same demister row can be in fluid communication with the same co-current flow channel. In this manner, the downcomer, demister rows, and the co-current flow channels defined therebetween provide a co-current contacting module of a given contacting stage. In general, vapor-liquid contacting apparatuses described herein will employ multiple contacting stages, each having a plurality of co-current contacting modules, which are often arranged in parallel (i.e., the pairs of demister rows and co-current flow channels between these rows extend in parallel) across a given contacting stage. Central receiving pans extend between, often in parallel with, demister rows of adjacent modules, while terminal receiving pans extend between a demister row of a given contacting stage and the vessel shell or wall.

Representative contacting stages therefore comprise at least one contacting module (e.g., 1, 2, 3, 4, 5, 6, 7, 8, 9, or 10 modules), each having a downcomer associated with two demisters. Representative contacting stages have modules in a parallel, alternative arrangement with receiving pans, where the number of receiving pans in a stage will generally exceed the number of downcomers by one, due to the placement of terminal receiving pans on both ends of each contacting stage.

The individual demister units of a demister row are advantageously secured at top and bottom sections, respectively, to the downcomer and the receiving pan adjacent the demister row.

According to one embodiment, connecting angles are used to secure the top sections of each demister unit at connecting flanges. The connecting angles, for example, may provide a secure connection of top sections of the demister units, by extending or folding over and covering upper portions of the connecting flanges as well as upper sections of the downcomer wall adjacent the connecting flanges. In a representative embodiment, a plurality of fasteners may be used, with these fasteners extending through both these connecting flanges of demister units and adjacent downcomer wall sections, as well as the opposite sides of the connecting angles, to which the ends of the fasteners are secured. The fasteners, for example, can be welded or pressure set. In a specific embodiment using pressure set fasteners, the fasteners can extend through aligned, L-shaped openings in the opposite sides of the connecting angles, as well as the upper connecting flange portions and adjacent downcomer wall sections disposed between these opposite sides.

The connecting flanges of demister units are therefore used to secure them, at their top sections, to wall sections of a downcomer, with demister units of a same demister row being secured to the same wall of a downcomer. Often, due to the geometry of the co-current flow channel, the demister units and/or the downcomer walls defining a co-current flow channel are angled somewhat with respect to vertical. Also, the demister units are usually not angled in alignment with the angle of the downcomer. Therefore, the connecting flanges of the demister units preferably have sufficient flexibility to bend in alignment with (i.e., to extend at the same angle as) the downcomer wall to which they are secured. This angle of alignment of the connecting flanges therefore will normally create an angle (i.e., not a linear, 180° angle) between them and the inlet surfaces of the demister units. According to a representative embodiment, the connecting flanges are bent upwardly from top plates covering top surfaces of the demister units. Unlike the inlet and outlet surfaces of the demister units, these top surfaces generally do not allow the passage of either liquid or vapor, and plates covering these top surfaces are therefore usually imperforate.

Further aspects of the invention relate to securing the bottom sections of the demister units, in a manner that, as discussed above with respect to the top sections, reduces or eliminates bypassing of vapor and/or liquid as it passes through a contacting stage. One manner of installing of the demister units involves initially placing bottom sections of the demister units in a matching or compatible section, such as a support rail. In other embodiments, however, a support angle extending below bottom surfaces of the demister units allows them to be installed securely even without a support rail, such that the support rail becomes an optional feature. In this case, the support angle rests on a vertically extending lip of a receiving pan.

According to an exemplary installation procedure, once the bottom section of a demister unit having such as support angle is in place, it may be pivoted or rotated through a minor angle (e.g., from about 10° to about 65°) about a fixed axis through a bottom corner of the demister unit. During its installation, a demister unit may therefore be initially positioned or oriented, for example, vertically or substantially vertically and then pivoted into its final, non-vertical design orientation such that the top section and connecting flange abuts a corresponding section of the downcomer wall, as discussed above. Advantageously, the installation may be facilitated using a support angle extending below bottom surfaces of the demister units, as discussed above. The support rail or support angle allows the desired pivoting during installation and, according to a preferred embodiment, forms a mechanical seal between the demister unit and the receiving pan, generally between the receiving pan lip and support device (e.g., support rail or support angle) at the bottom section of the demister units. Preferably, after the demister units are pivoted into their final, non-vertical design orientation, they are then secured at their top sections using connecting angles as described above.

Additional aspects of the invention relate to improved connections between the individual demister units of a demister row to further stabilize these components and provide a robust, and easily assembled contacting stage. According to a representative embodiment, adjacent demisters of a demister row are secured using interconnecting, abutting side plates. For example, the two side plates of each adjacent demister in a demister row may be, respectively, "male" and "female" interconnecting side plates, with an extension of a male interconnecting side plate fitting into, or cooperating with, a pocket of a complementary female side plate. Two or more demister units of a demister row can be assembled through their interconnecting side plates prior to installation and attachment to receiving pans and downcomers. The two final or end demister units of a demister row may have two male side plates, one of which is complementary to an adjacent, abutting female side plate of an adjacent demister unit and the other of which is complimentary to a female pocket at an end of the downcomer. Thus, the downcomer may have opposite side ends with connections, such as the female connections of side plates of demister units, for securing side plates of demister units at each end of a demister row. Female pockets at these side ends can therefore interconnect with male interconnecting side plates of these demister units.

Further embodiments of the invention are directed to apparatuses for performing co-current vapor-liquid contacting, comprising a contacting stage, and preferably a plurality of such stages, as described above. In the case of multiple stages, each of the separate receiving pans of a given contacting stage may have one or more ducts, with each duct of one receiving pan providing fluid communication to a separate downcomer of an inferior stage. The contacting stage and inferior contacting stage are normally in non-parallel alignment.

Other embodiments of the invention are directed to apparatus for performing co-current vapor-liquid contacting, having a contacting stage comprising at least one downcomer having an outlet proximate at least one co-current flow channel. The contacting stage further comprises at least one demister row comprising a plurality of demister units, with each demister unit having (i) inlet surfaces proximate the co-current flow channel and outlet surfaces superior to a receiving pan, and (ii) connecting flanges extending above top surfaces of the demister units. The contacting stage also has at least one duct having an upper end in fluid communication with the receiving pan and a lower end. The lower end of each duct is in fluid communication with a separate downcomer of an inferior stage. The contacting stage of the vapor-liquid contacting apparatus is rotated with respect to an inferior stage of the apparatus. Typically, the contacting stage has at least two demister rows, with the downcomer being spaced between these rows to provide a co-current contacting module of the contacting stage.

The contacting stages can have any of structural enhancements discussed above, alone or in combination, which improve their integrity and performance. Particular structural enhancements are directed to providing secure attachments between top and bottom sections of the demister units and, respectively, the receiving pan and adjacent wall sections of the downcomer. With respect to the top sections, these attachments include the use of connecting angles extending over and covering upper portions of the connecting flanges of the demister units and adjacent wall sections of the downcomer. With respect to the bottom sections, these attachments include the use of support angles extending below bottom surfaces of the demister units. Other structural enhancements, which can be used alone or in combination with these, include those described above which can connect adjacent demister units through abutting, interconnecting side plates and which can connect the ends of demister rows to opposite side ends of the downcomer.

Further embodiments of the invention are directed to methods for contacting vapor and liquid streams. The methods comprise passing the streams through co-current flow channels of the apparatuses described above.

These and other embodiments relating to the present invention are apparent from the following Detailed Description.

The same reference numbers are used to illustrate the same or similar features throughout the drawings. The drawings are to be understood to present an illustration of the invention and/or principles involved. As is readily apparent to one of skill in the art having knowledge of the present disclosure, apparatuses and their associated contacting stages with demister rows, downcomers, receiving pans, and connections, according to various other embodiments of the invention will have configurations and components determined, in part, by their specific use.

DETAILED DESCRIPTION

Figure 1:
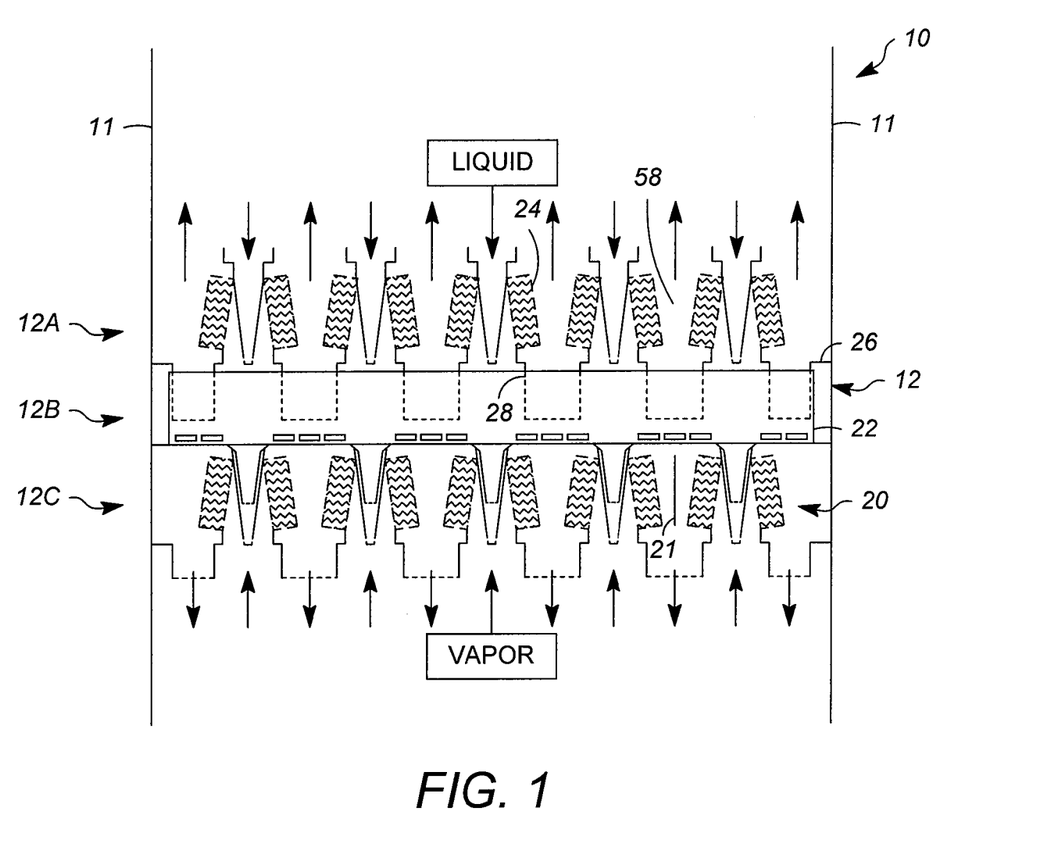
FIG. 1 is a cross-sectional schematic of a representative apparatus comprising contacting stages with contacting modules.

FIG. 1 illustrates a co-current vapor-liquid contacting apparatus according to the present invention, comprising stages within a vessel 10. The vessel 10 may be for example a distillation column, absorber, direct contact heat exchanger, or other vessel used to conduct vapor-liquid contacting. The vessel 10 contains contacting stages 12 and optional collector/distributors. A fractionation or distillation column typically contains from about 10 to about 250 or more contacting stages 12. The design of contacting modules 20 of these stages may be essentially uniform throughout the column, but it may also vary, for example, to accommodate changes in fluid flow rates in different parts of the column. For simplicity, only three contacting stages, namely upper 12A, middle 12B, and lower 12C contacting stages, are shown in FIG. 1.

It is understood that an apparatus such as a distillation column may contain several sections, with each section having numerous contacting stages. Also, there may be a plurality of fluid feed introductions and/or fluid product withdrawals between and/or within sections. Conventional contacting devices (e.g., trays and/or packings) used in distillation may be mixed in the same and/or different sections of the apparatus (e.g., above and/or below), as the sections having contacting stages described herein. The vessel 10 includes an outer shell 11 that typically has a cylindrical cross section.

According to FIG. 1 each contacting stage 12 has a 90° rotation with respect to the directly superior and inferior stages, thereby distributing liquid in a direction that is orthogonal to the immediately superior and inferior stages to reduce liquid maldistribution. In other embodiments, vertically adjacent contacting stages may be oriented with different degrees of rotation that may be the same from stage to stage or may vary. Each contacting stage 12 comprises a plurality of contacting modules 20 and receiving pans 26. Contacting modules 20 each comprise a pair of rows of demisters 24 with a downcomer 22 extending therebetween. Because of the orthogonal nature of the three contacting stages shown in FIG. 1, end views of the five representative pairs of demister rows 24 of the upper contacting stage 12A are shown. In the middle contacting stage 12B, therefore, elongated demister rows 24 run parallel to the elongated downcomer 22 from one side of the outer shell 11 of the vessel 10 to the other. The orientation of demister rows 24 and downcomers 22 in the lower contacting stage 12C is the same as that in the upper contacting stage 12A.

Figure 2:
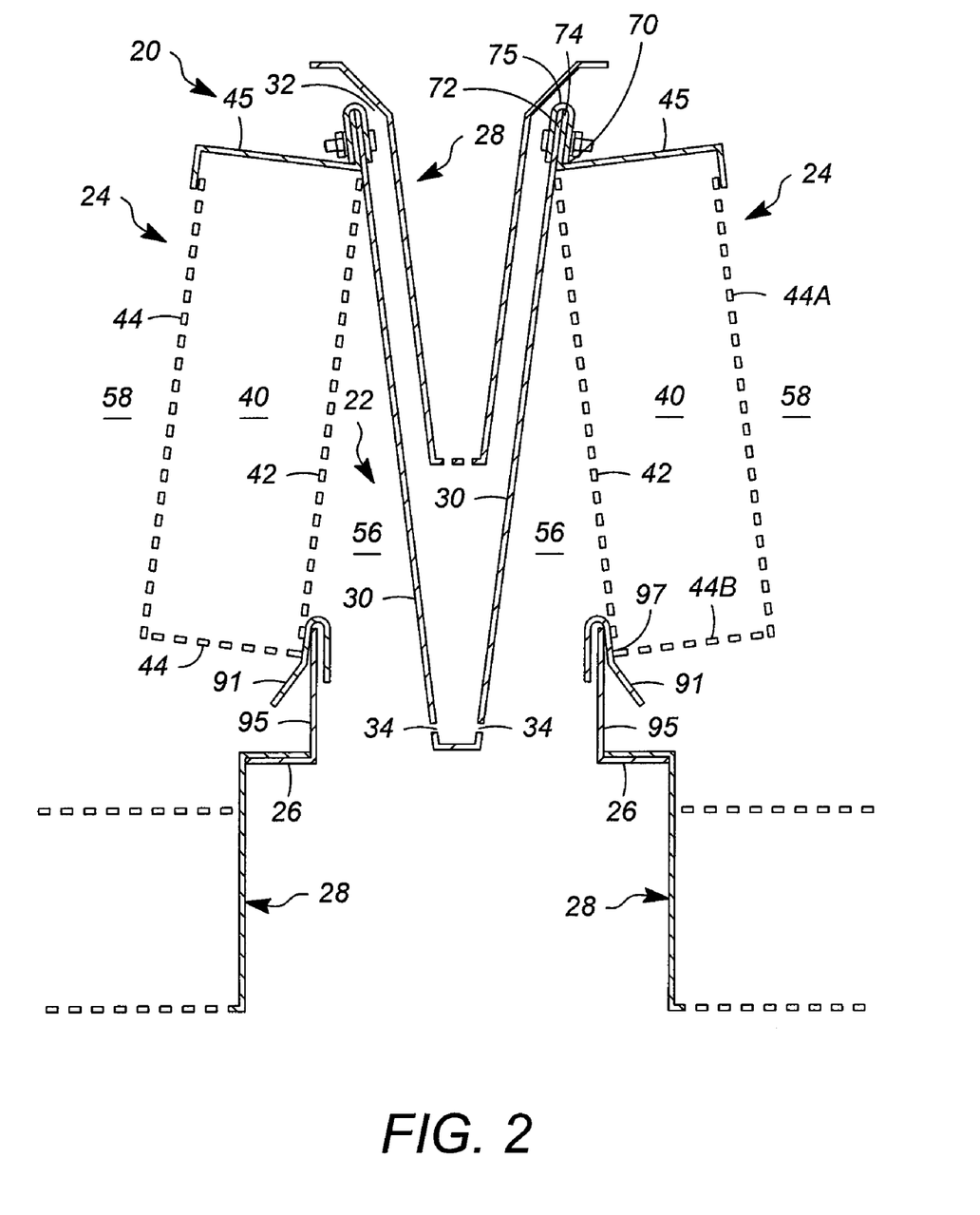
FIG. 2 is a cross-sectional schematic of a representative individual contacting module.

FIG. 2 shows an enlarged and more detailed view of an individual contacting module 20 that illustrates liquid distributor or downcomer 22 being located between a pair of vapor-liquid separators or demister rows 24. The downcomer 22 and demister rows 24 cooperate to define the co-current fluid contacting volume or co-current flow channel 56. In addition to the contacting modules 20, each contacting stage also includes a plurality of receiving pans 26, with each receiving pan 26 having a plurality of ducts 28. An inlet 32 to the downcomer 22 is configured to engage the ducts 28 of a receiving pan of the immediately superior contacting stage. FIG. 2 therefore illustrates the cooperation among various components, namely demister rows 24 and downcomer 22 to form co-current flow channel 56.

FIG. 2 also shows the attachment between demister rows 24, as well as each individual demister unit 40 that is used to form demister rows 24, with both the downcomer 22 and receiving pan 26. A top section, for example a top corner 70 of each demister unit, may be secured to the downcomer wall 30 at an adjacent wall section 72. A connecting flange 74 extending above a top surface 45 of each demister unit 40 of demister row 24 may be used for this attachment. In the embodiment shown in FIG. 2, connecting flange 74 is provided by bending an imperforate top plate, a portion of which forms top surface 45, upwardly and in alignment with the adjacent wall section 72 of the downcomer 22. Since the demister units 40 (also termed "separator boxes") of demister rows 24 are angled differently than downcomer wall 30, the aligned connecting flange 74 extends at an angle with respect to perforated inlet plate 42, as an inlet surface of demister unit 40. Perforated plate 42, allows vapor and entrained liquid, rising through co-current flow channel 56, to enter demister unit 40. Separated vapor and liquid exits the demister unit 40 predominantly through a perforated outlet plate, which forms an outlet surface 44A and possibly also a bottom surface 44B of demister unit 40. Exiting liquid then drains into receiving pan 26 and connecting ducts 28 which lead to a downcomer of an immediately inferior contacting stage, while exiting vapor rises into a co-current flow channel of an immediately superior contacting stage.

Figure 4A:
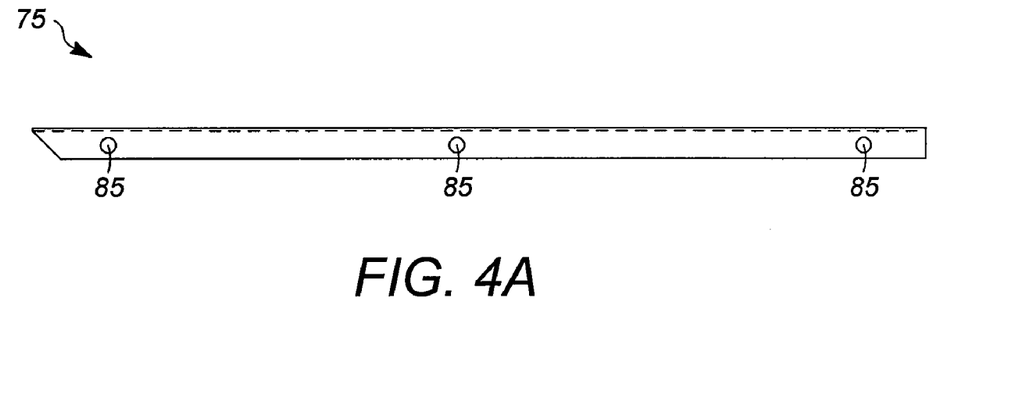
FIG. 4A is a front view of a connecting angle for securing a top section of a demister unit to a downcomer wall.
Figure 4B:
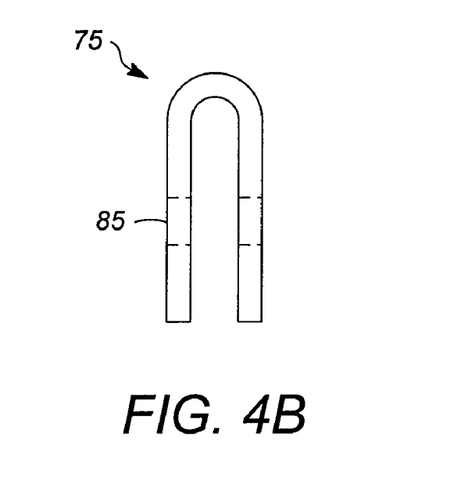
FIG. 4B is an end view of the connecting angle of FIG. 4A.
Figure 4C:
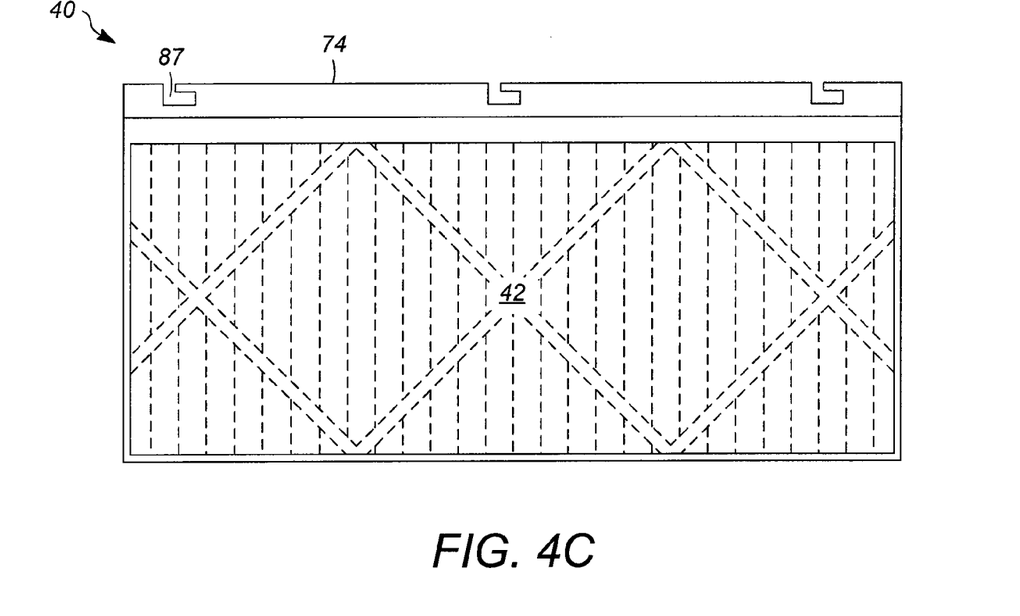
FIG. 4C is a front view of a demister unit, showing its inlet surface and a connecting flange extending above a top surface, with the connecting flange having L-shaped openings in its upper portion, through which fasteners can extend.
Figure 4D:
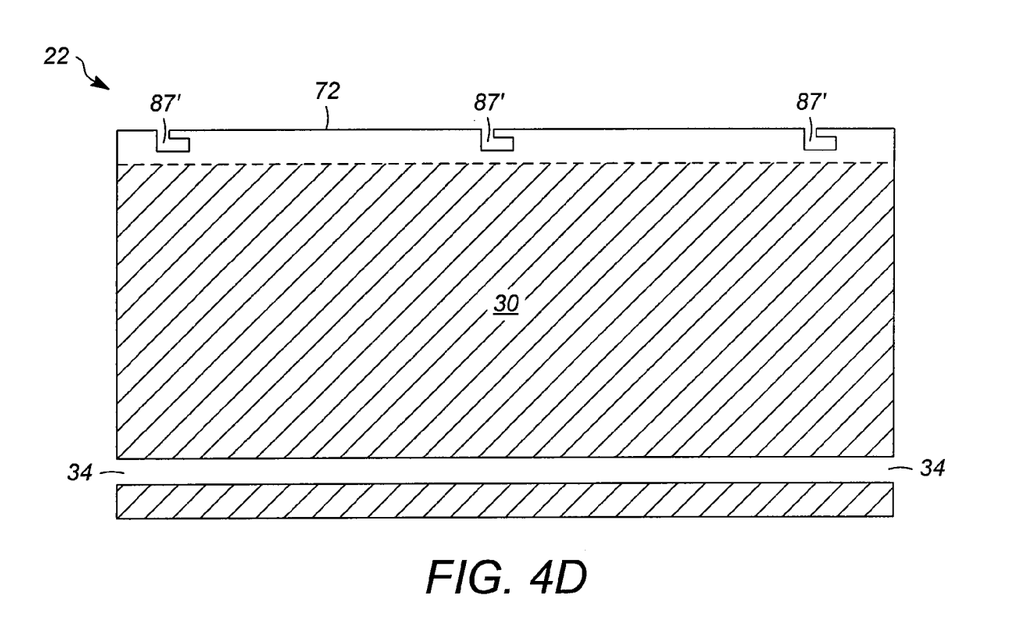
FIG. 4D is a front view of a downcomer having L-shaped openings in wall sections adjacent to the connecting flange of the demister unit shown in FIG. 4C, with the L-shaped openings being aligned.

As shown in FIG. 2, a connecting angle 75 secures each demister unit, at its top section 70, to downcomer 30. In particular, connecting angle 75 extends over and covers all or an upper portion of connecting flange 74, as well as adjacent wall section 72 of downcomer 30. Separate connecting angles 75 may secure each demister unit individually. Alternatively, connecting angles 75 may be fabricated with different lengths to secure a plurality of demister units or even an entire demister row. The use of connecting angles of a constant, predetermined length can be used with advantage for consolidation of design. FIG. 4A shows a side view of a typical connecting angle 75, in the form of an elongated metal strip with, holes 85 into which fasteners can be inserted. The end view of connecting angle 75 in FIG. 4B shows a U-shaped cross section that, as discussed above with respect to FIG. 2, fits over and clamps the connecting flange 74 of a demister unit 40 to its adjacent downcomer 30. An exemplary means for providing this connection with a demister unit is shown in FIG. 4C, which is a front view of an individual demister unit, showing its perforated inlet plate as an inlet surface 42 as well as a connecting flange 74 extending above a top surface 45, with the connecting flange 74 having L-shaped openings 87 in its upper portion, through which fasteners can extend. FIG. 4D is a front view of a downcomer 30 having L-shaped openings 87' that align with L-shaped openings 87 in the connecting flange of the associated demister unit. As shown in FIG. 4D, these L-shaped openings 87' are in adjacent wall sections 72 of downcomer 30 that is secured to the demister unit through these openings 87'.

Figure 4E:
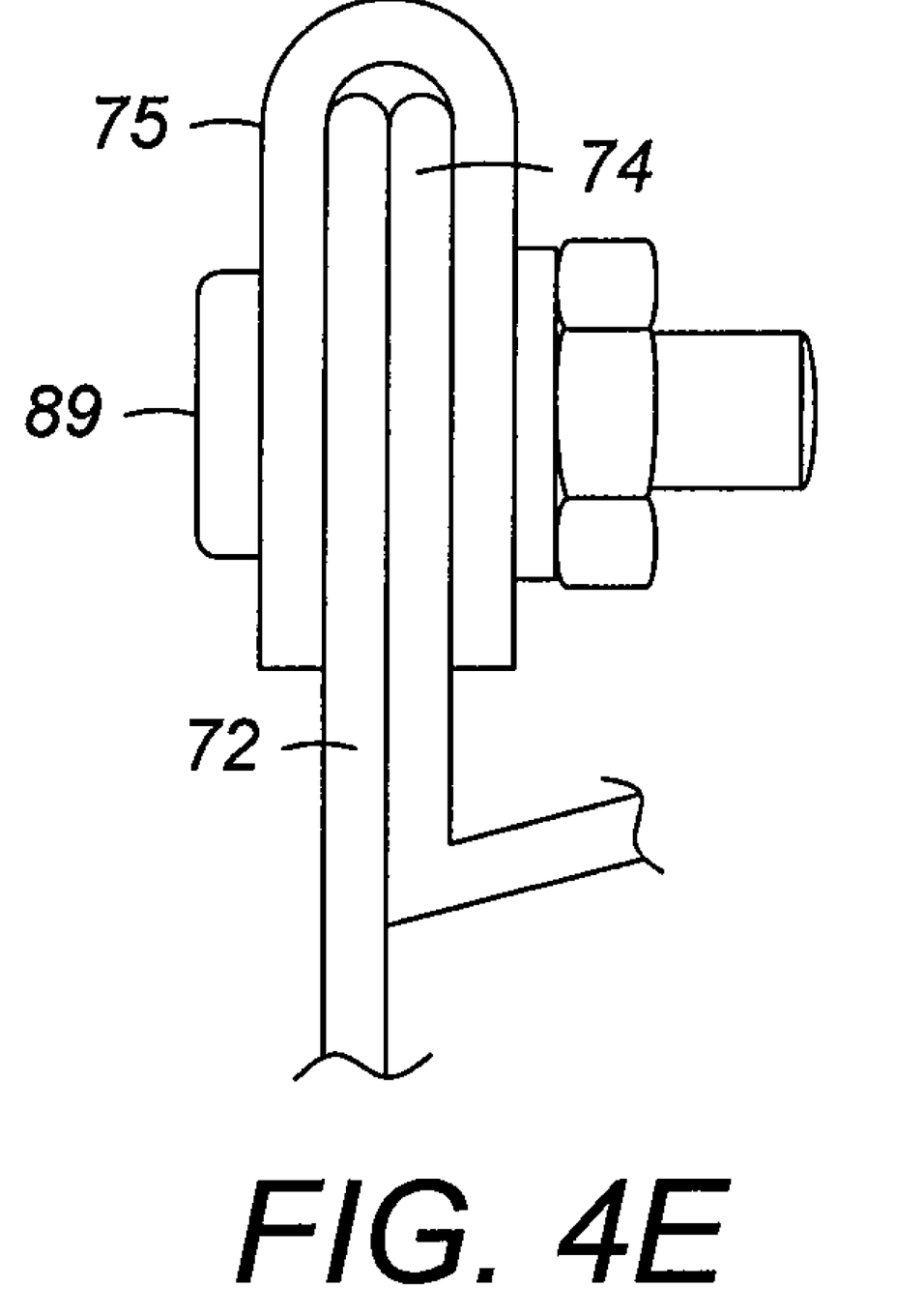
FIG. 4E is an end view of the connecting angle of FIG. 4A, securing, therebetween, an upper portion of the connecting flange of the demister unit and an adjacent wall section of a downcomer.

FIG. 4E is also an end view of the connecting angle of FIG. 4A. However, the upper portion of the connecting flange 74 of the demister unit 40 and an adjacent section 72 of wall 30 of downcomer are shown disposed and secured between opposite sides of connecting angle 75 using one or more fasteners 89 for each demister unit. These fasteners 89 can be welded or pressure set, with the latter type including, for example, PEM® self-clinching fasteners (Penn Engineering, Danboro, Pa., USA). In the case of such fasteners extending through aligned, L-shaped openings 87 in the upper portions of connecting flanges 74 and the adjacent wall sections 72 of the downcomer, fasteners 89 may be fed into these openings or slots and moved to a far end thereof. In this position, the pressure applied by the tightened fasteners can provide a seal at the top section 70 of a demister unit, maintain rigidity between the demister unit and downcomer (e.g., prevent parts from sliding) and help support the weight of the demister unit.

Alone or in combination with securing top sections 70 of each demister unit 40 of a demister row 24 to the same, adjacent wall section 72 of downcomer 22, bottom sections of each demister unit in the same demister row may likewise be secured to the same, adjacent receiving pan. FIG. 2 illustrates vertically extending lips 95 of receiving pan 26 that cooperate with a bottom section, for example a bottom corner 97 that is supported by vertically extending lips 95. An additional element such as a demister support rail can be used to guide a support angle 91 that is inserted therein, but such a support rail is normally not required with support angle 91, which advantageously provides sufficient structural support for the bottom edges of demister units. Additional support is then provided when top sections 70 are secured to adjacent wall sections 72 of downcomer 22.

Figure 5A:
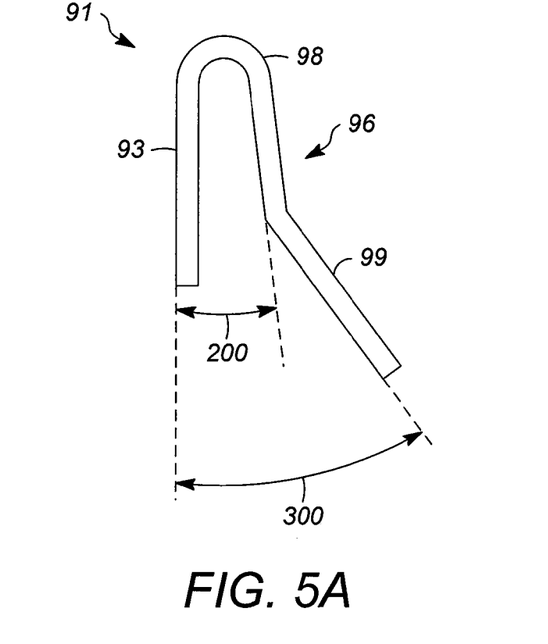
FIG. 5A is an end view of a support angle for a demister unit.

FIG. 5A depicts a close-up view of representative support angle 91, which allows initial positioning of individual demister units, during installation, against a vertically extending lip 95 of a receiving pan 26. After this initial positioning, in which demister units may be oriented vertically to engage a straight end 93 with the vertically extending lip 95, support angles 91 also advantageously allow demister units to be pivoted from this vertical orientation to a non-vertical, design orientation in which connecting flanges extending above top surfaces of the demister units are aligned with, and secured to, adjacent downcomer wall sections as described above.

The pivoting of demister units about support angle 91 in this manner can form a mechanical seal between this support angle and vertically extending lips of the receiving pan, thereby preventing the bypassing or leakage of vapor and/or liquid of the contacting stage and improving efficiency of the vessel in carrying out, for example, distillation.

Figure 5B:
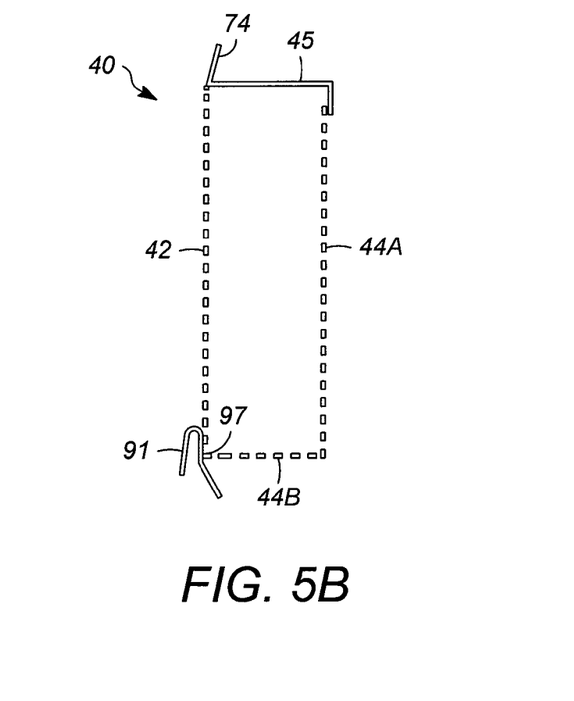
FIG. 5B is a side view of a demister unit having a support angle extending below its bottom surface and a connecting flange extending above its top surface.

The representative support angle in FIG. 5A therefore includes a straight end 93, which is normally distant with respect to the inlet surface of the demister unit, and a bent end 96, which is normally proximate with respect to this inlet surface and can serve as a point of attachment with the bottom section of the demister unit. As shown in FIG. 5A, a first, inner portion 98 of this bent end 96 is angled at a smaller angle 200, for example from about 0° to about 30°, often from about 5° to about 15°, with respect to straight end 93. A second, outer portion 99 of this bent end 96 is angled at a larger angle 300 with respect to straight end 93 to allow proper pivoting about, and formation of a mechanical seal with, a receiving pan, and particularly at its vertically extending lip. FIG. 5B illustrates the attachment, for example by welding, of support angle 91 to a bottom section 97 of a demister unit 40 for a demister row. Support angle 91 extends below a bottom surface 44B that is often formed from an extension of the perforated plate used for outlet surface 44A of demister unit 40. Openings in the perforated plates used for outlet and bottom surfaces 44A, 44B may or may not be the same types of openings. For example, openings in bottom surface 44B are designed to allow drainage of exiting, disengaged liquid. In normal operation, this liquid is separated from a vapor stream entraining this liquid as it enters perforated inlet plate 42, as an inlet surface, of demister unit 40. Support angle 91 thus allows for easy initial placement of a demister unit onto a vertically extending lip of a receiving pan. Support angle 91 is sufficiently open, by means of smaller and larger angles 200, 300 to allow the demister unit to be pivoted or rotated from a vertical position to its final design position. In a particular embodiment, this final design position advantageously wedges the vertically extending receiving pan lip and support angle to form a mechanical seal. The ability to pivot demister unit also facilitates the formation of connections between adjacent, abutting side plates, for example using male and female interconnecting side plates as discussed in greater detail below.

The representative demister unit depicted in FIG. 5B is also shown with connecting flange 74 extending above top surface 45. As discussed above, connecting flange 74 may be formed from an extension of part of an imperforate top plate that covers a top surface.

As is also illustrated in FIG. 2, downcomer 22 has an inlet 32 in an upper portion and an outlet 34 having one or more outlet openings in a lower portion. Two sloped downcomer walls 30 taper the downcomer 22 in the downward direction. The bottom of the substantially V-shaped downcomer 22 near outlet 34 may be pointed, curved, or flat as shown in FIG. 2. Alternative embodiments having downcomers of various different shapes, such as stepped or sloped and stepped, are possible. In further embodiments the cross sectional shape of the downcomer may be rectangular (e.g., square), or it may be curved, irregular, or otherwise configured to define a desired co-current flow channel and geometry for delivering liquid thereto. A V-shaped downcomer, as shown, provides a combination of a large contacting volume between the demisters 24 and downcomer walls 30 in the lower portion of each stage 12 and a large downcomer inlet 32 in the upper portion for accommodating enlarged ducts 28 and increasing liquid handling capability.

The downcomer outlet 34 generally has a plurality of slots, perforations, or other types of openings arranged in one or more rows near the bottom of the downcomer 22. The downcomer openings may be located in the walls 30 and/or the bottom of the downcomer. In operation, a liquid level in the downcomer 22 can provide a seal to prevent the ascending vapor from entering the downcomer through the outlets 34. The openings of downcomer outlet 34 are preferably distributed along the length of the downcomer 22 and they may be arranged such that the openings are varied in size or number or eliminated in the portions of the downcomer 22 that are above an inferior downcomer, to help prevent liquid from flowing directly from one downcomer into an inferior downcomer.

Figure 3:
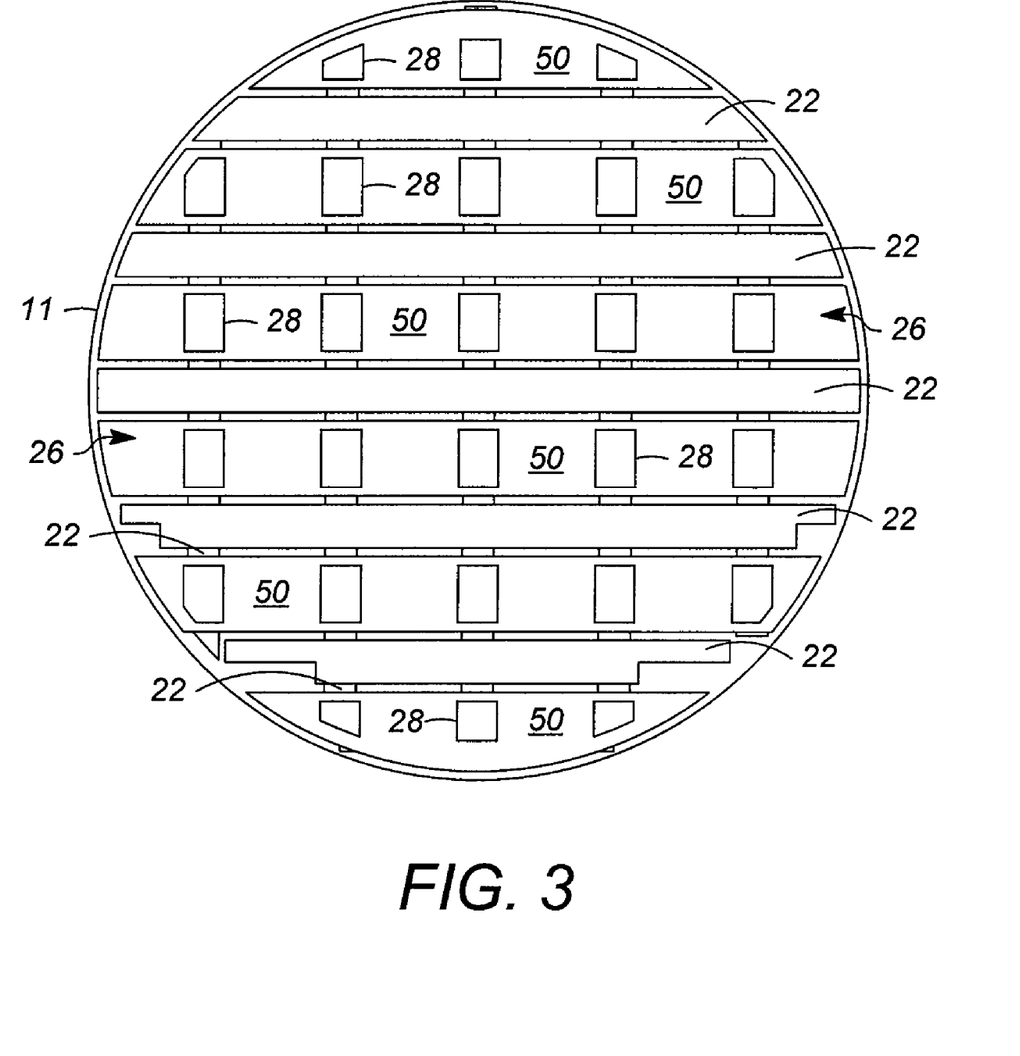
FIG. 3 is a top view of an individual contacting stage.

FIG. 3 illustrates a top view of two adjacent (inferior and superior) stages in which the demister rows are not shown to more clearly show the arrangement of receiving pans 26, ducts 28, and downcomers 22. At each stage, the receiving pans 26 are substantially parallel and are spaced apart across the cross sectional area of the apparatus or vessel. The downcomer 22 of a contacting module 20 is located between each pair of adjacent receiving pans 26 of the same contacting stage, resulting in an alternating pattern of receiving pans 26 and modules 20. Downcomers 22 and the receiving pans 26 at each stage may be supported by support rings (not shown) affixed to the inner surface of the vessel wall or outer shell 11 by welding or other conventional means. The downcomers 22 and their associated receiving pans 26 may be bolted, clamped, or otherwise secured to the support ring to maintain them in a desired position or column height during operation and to prevent fluid leakage across the stages, outside of desired contacting areas.

Receiving pans located between two contacting modules, and those located between a module and the vessel shell or outer wall, are referred to as central and terminal receiving pans, respectively. Central receiving pans are thus shared by two adjacent contacting modules. In another embodiment (not illustrated) a pair of receiving pans is incorporated into each contacting module. When such modules are arranged in a substantially parallel alignment across the stage, the modules are adjacent such that there are two receiving pans between each pair of adjacent downcomers. A vertical baffle 21 (FIG. 1) is optionally included between two adjacent contacting modules 20 in order to intercept vapor emanating from the demisters 24 and, in general, to reduce any tendency of the emerging fluids to interfere with each other in a fluid transfer volume 58 above receiving pans 26. The vertical baffle 21 may be situated between and substantially parallel to the demisters 24 of adjacent contacting modules 20.

Figure 6A:
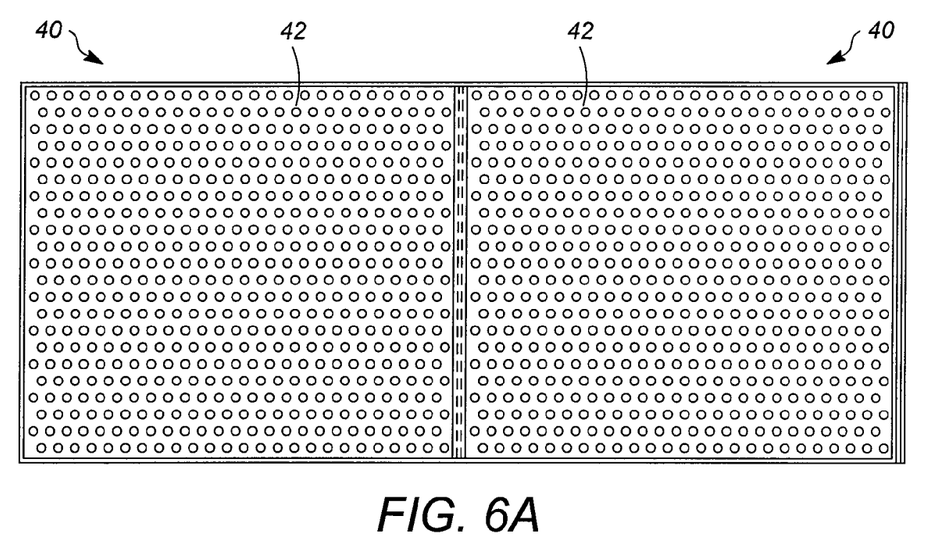
FIG. 6A is a front view of two demister units and their interconnecting side plates.

Other structural features associated with contacting stages include interconnecting side plates for securing adjacent demister units of demister rows. The demister rows generally run substantially along the length of an adjacent downcomer in rows on either side. FIG. 6A (front view) and FIG. 6B (top view) illustrate how two adjacent demister units of a demister row may use interconnecting, abutting side plates to further improve the structure of a contacting stage. In particular, demister units 40 each have a have a male 46 and a female 48 interconnecting side plate to provide secure connections and help seal the junctions between individual demister units and thereby substantially prevent fluid leakage through these junctions. Additional ways to provide interconnecting side plates of demister units include the use of suitable fasteners such as bolts, clips, pins, clamps, or bands. Welding is also possible.

In a particular embodiment, demister units at each, opposite end of a demister row may have terminal side plates, i.e., that do not interconnect with a side plate of an adjacent demister unit, but instead interconnect with opposite ends of the downcomer. Thus, the downcomer itself, at opposite side ends, can have connections for securing these terminal side plates of a demister row. In one embodiment, for example, these connections 105 can be in the form of female ends or pockets 48A, as shown in FIG. 6C, that interconnect with male interconnecting side plates of demister units 40 at each end of a demister row. These demister units at each end may therefore each have two side plates with male connections, unlike intermediate demister units having one side plate with a male connection and another side plate with a female connection. This allows the demister units at each opposite end to be secured into position, affixes the position of the entire demister row relative to its adjacent downcomer, and helps seal the demister rows at each end. According to particular embodiments, at least one, and possibly both, female pockets 48A at side ends of a downcomer may also be adjustable to allow for design tolerances.

Figure 6B:
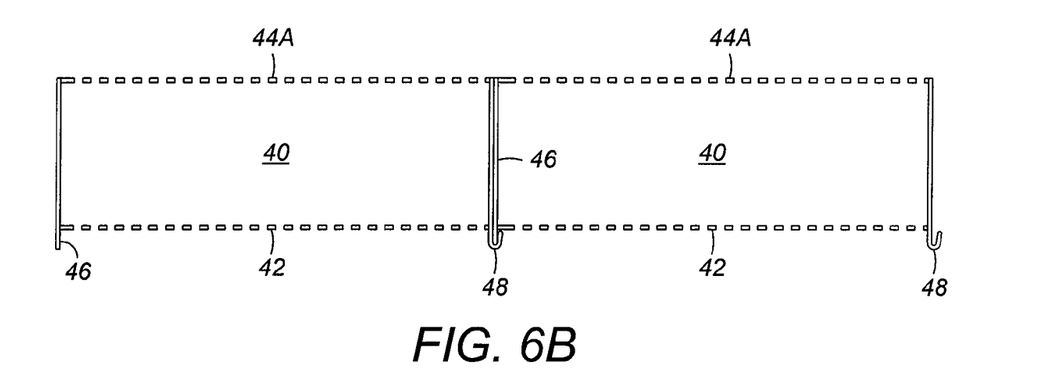
FIG. 6B is a top view of the demister units of FIG. 6A, showing their adjacent, abutting male and female interconnecting side plates.
Figure 6C:
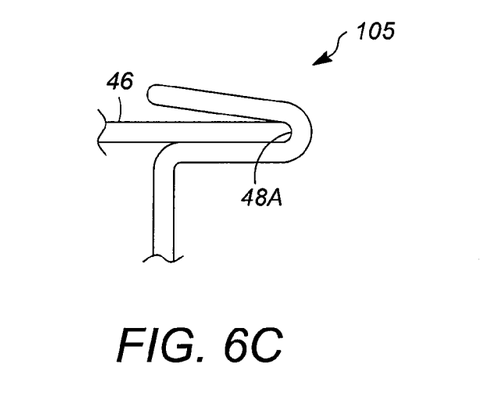
FIG. 6C is a top view of a female pocket of a downcomer, for interconnecting with demister units at ends of demister rows. (#105 needs to point to a connection of 46 and 48A)

The particular male and female tab and slot interconnections, as shown in FIGS. 6A and 6B, can advantageously provide quick assembly and disassembly of demister rows. The modular configuration of the demister units 40 allows a fabricator to produce these units in one or a small number of standard sizes to be assembled into demister rows of varying length. This simplifies the design and construction of demister units, as well as their assembly into demister rows. Some custom-sized demister units may be required for particularly short demister rows or to match the length of a downcomer depending on the dimensions of the apparatus and the variety of standard size demister units available. The modular design has the further advantage of easing the assembly of a co-current contacting stage since the demister units are lighter than an entire row of demisters formed of a single unit. However, according to some embodiments, a single demister unit can also serve as the complete demister row.

Demister rows are therefore used to de-entrain liquid droplets from a vapor stream. One example is a mist eliminator, such as a separation vane type demister having various channels and louvers such that the fluid stream passing through the demister must undergo several changes in direction, forcing entrained liquid droplets to impact portions of the separation structure and flow downward to the bottom of the demister. Examples separation vane structures for demisters (or vapor-liquid separation devices) are mesh pads or woven threads. Combinations of these structures can also be used. Many possible variations in the design of the separating structures in demister units are possible, the important consideration being the effectiveness of these structures in separating entrained liquid from a flowing vapor stream. This effectiveness is thought to correlate with the number of obstructions in the fluid flow which cause liquid droplets to impact a solid surface. Structures having numerous dead ends may lead to the formation of relatively quiescent regions, also promoting liquid separation.

As shown in FIG. 2, and discussed above, various optional elements may cooperate with and/or be incorporated into demister units 40 to further improve the performance and/or structural integrity of the overall contacting stage. For example, a perforated inlet plate 42 as an inlet surface, a perforated outlet plate 44A as an outlet surface, and an imperforate top plate, a portion of which covers top surface 45 and another portion of which forms connecting flange 74, are shown. Perforated plates are thus one type of flow manipulator that may cooperate with the demister 24. Other non-limiting examples of flow manipulators that can serve as inlet surfaces 42 for demister 24 include expanded metal, porous solids, mesh pads, screens, grids, mesh, profile wire screens, and honeycombs. It has been found that the fractional open area of the flow manipulators affect both separation efficiency and pressure drop of the demister 24. The fractional open area of the flow manipulators may vary on different sides and on the same side of the demister to optimize the separation efficiency and pressure drop of the demister 24. Various types of flow manipulators may be used in a single demister. In other embodiments, flow manipulators are not used on some or any of the inlet and outlet surfaces of the demister.

Demister units may be fabricated initially from a five-sided box, with an imperforate top plate covering top surface 45 of the demister unit 40 and also providing a flexible extension as a connecting flange 74 for alignment with the angle of an adjacent wall section of a downcomer. Imperforate side plates, which may have male and female connections as discussed above, may also form sides of the box, together with perforated plates or other substantially open structures as bottom and outlet surfaces. After filling the five-sided box with separation vane or other mist eliminator structures, the body of the demister unit is completed by attaching (e.g., welding) a perforated inlet plate as an inlet surface.

The perforated inlet plate or other flow manipulator as an inlet surface 42 is proximate the downcomer 22 and receiving pan 26 (or vertically extending lips 95 thereof). The perforated outlet plate, as an outlet surface 44A extends along the majority of the demister side opposite the perforated inlet surface 42 and possibly also along bottom surface 44B of the demister unit 40. The imperforate top plate 45 prevents fluid from leaving the demister unit 40 directly from the top and increases the vapor-liquid separation efficiency. In a particular embodiment, the imperforate top plate, a portion of which covers top surface 45, has bent strips on both sides, one following downcomer wall 30, for attaching with the wall as a connecting flange 74, and the other following the perforated outlet plate 44A of the demister 40 for connecting with the perforated outlet plate 44A. It has been found that the imperforate strip extending down a distance from the top of the perforated outlet plate 44A also improves vapor-liquid separation efficiency. The strip typically extends to cover from about 5% to about 30%, and generally from about 10% to about 20%, of the height of the demister outlet.

The plurality of ducts 28 extend through the receiving pan 26 into the downcomer inlet 32. Each of the ducts 28 that extends through a particular receiving pan 26 directs liquid into a different inferior downcomer 22, as is best shown in FIG. 3. As illustrated in this representative embodiment, the top of the duct 28 is flush with the horizontal surface 50 of the receiving pan 26 so that liquid may flow freely from the receiving pan 26 into the duct 28 without any obstruction. In other embodiments the ducts may hang from the receiving pan by having a lip that rests on the flat base 50 of the receiving pan when the ducts are fitted through the openings. The ducts may also be mounted to the underside surface of the receiving pans. Any conventional means of connecting the ducts and receiving pans may be used including but not limited to hanging, bolting, welding, and pressure fitting. Gaskets and/or sealants may be used to prevent leakage between the receiving pans and the ducts. In other embodiments the ducts may be at least partially defined by the portion of the flat base of the receiving pan that may be cut and folded or pushed out when the openings are formed. Further, the top mouth of the duct 28 may be enlarged and wider than downcomer inlet 32 as shown in FIG. 2 to increase liquid handling capability and reduce choking tendency at the duct inlet. The sidewalls of the ducts 28 are sloped so that the ducts 28 fit within the downcomers 22 and leave a gap for easy installation and vapor venting, as shown in FIG. 2.

Vapor may enter into downcomer 22 with liquid flow from a superior stage or through downcomer outlet 34 when one or more of its openings is not completely sealed by a liquid level in downcomer 22. If vapor in the downcomer 22 is not properly vented from its inlet 32, it will be forced into ducts 28, which may choke the liquid flow through the ducts and cause severe entrainment and premature flooding of the apparatus. Therefore, it is generally beneficial to vent the vapor in downcomer 22 through gaps between ducts 28 and downcomer 22 or openings at the top of the downcomer 22 between ducts 28. The bottom of duct 28 is opened with one or more openings, for example a plurality of spouts or one continuous slot or single larger opening to allow liquid to flow into the downcomer 22. Under normal operating conditions, ducts 28 are sealed against vapor flow either dynamically by liquid in the ducts 28 or statically by liquid in the downcomer 22.

The volume between inlet surface 42 of demister row 24 and the adjacent wall 30 of the downcomer 22 forms a fluid contacting volume or co-current flow channel 56, shown in FIG. 2. After co-current flows of vapor and liquid are contacted in co-current flow channel 56, fluid contacting continues in demister units 40 before vapor and liquid are separated. A perforated plate or other flow manipulator at inlet surface 42 of demister row 24 improves fluid flow distribution through demister row 24 and improves vapor-liquid separation. A flow manipulator at inlet surface 42 may also improve fluid contacting and mass transfer. The volume above receiving pan 26 and between demister rows 24 that it supports defines fluid transfer volume 58. The demister rows 24 may be oriented at an angle from vertical as illustrated in FIG. 2 to provide improved geometries of co-current flow channel 56, having a decreasing volume from bottom to top (to match decreasing vapor flow in this volume) and fluid transfer volume 58, having an increasing volume from bottom to top (to match increasing vapor flow in this volume).

The fluid flows through a contacting module 20 of an intermediate contacting stage 12 include liquid flow from a superior stage that is directed into the downcomer 22 by several receiving pans 26 of a superior stage, in cooperation with ducts 28 of this superior stage. The liquid, which forms a liquid level, exits the downcomer 22 through outlet 34 and enters the co-current flow channel 56. The upward vapor velocity is sufficient in co-current flow channel 56 to entrain the entering liquid. The entrained liquid is carried upward by the rising vapor to inlet surfaces 42 of demister units 40. The vapor and liquid are separated by the separating structures, as discussed above, within demister units 40, such that the separated vapor exits demister units 40 predominantly through outlet surface 44A into fluid transfer volume 58. The separated vapor then continues upward to a co-current flow channel 56 of a superior contacting stage 12. The separated liquid exits the demister units 40 through a bottom surface 44B (which may be a bottom portion of outlet surface 44A), and flows onto the receiving pan 26. The receiving pan 26 then directs the separated liquid into the plurality of ducts 28, each of which ducts 28 of a given receiving pan direct the liquid into a different inferior downcomer 22.

According to other embodiments, in lieu of perforated inlet plates 42, a porous blanket layer such as mesh pad may be used as an inlet surface for demister units 40. The use of this porous blanket has been found to improve vapor-liquid separation, especially during operation at higher vapor rates. The porous blanket can be of conventional mesh material used for liquid droplet de-entrainment or so called "mist eliminators." It will typically comprise very loosely woven strands forming a high surface area, low pressure drop blanket. The mesh blanket is for fine droplet coalescence and liquid distribution to the separator. An alternative construction involves mounting the mesh in an indentation in a separation structure inside a demister unit 40.

Overall, aspects of the invention are directed to the use of structural enhancements in co-current contacting stages in which co-current flow channels are formed from the cooperation of a number of components including downcomers, demister rows, and receiving pans. These contacting stages are normally incorporated into vessels for carrying out vapor-liquid contacting. Those having skill in the art will recognize the advantages of the structural enhancements and associated methods described herein and their suitability in other applications. In view of the present disclosure, it will be appreciated that other advantageous results may be obtained. Those having skill in the art, with the knowledge gained from the present disclosure, will recognize that various changes can be made in the above equipment and methods without departing from the scope of the present disclosure. Mechanisms used to explain theoretical or observed phenomena or results, shall be interpreted as illustrative only and not limiting in any way the scope of the appended claims.

The invention claim is:

1. A contacting stage for an apparatus for performing co-current vapor-liquid contacting, said contacting stage comprising:
   a) a pair of demister rows being spaced apart and comprising a plurality of individual demister units having connecting flanges extending above top surfaces of said demister units;
   b) a pair of receiving pans on alternate sides of said spaced apart demister rows;
   c) a downcomer between said spaced apart demister rows and defining, with inlet surfaces of said demister units, a pair of co-current flow channels on opposite sides of said downcomer, and
   d) connecting angles extending over and covering (i) upper portions of said connecting flanges of said demister units and (ii) adjacent wall sections of said downcomer, thereby securing top sections of said demister units to a wall of said downcomer,
   wherein bottom sections of said demister units are secured to said separate receiving pans.

2. The contacting stage of claim 1, wherein said demister units of the same demister row of said pair of demister rows have outlet surfaces superior to the same receiving pan of said pair of receiving pans.

3. The contacting stage of claim 1, wherein said inlet surfaces of demister units of said demister rows are in fluid communication with said co-current flow channels.

4. The contacting stage of claim 3, wherein said downcomer has an outlet in fluid communication with said co-current flow channels.

5. The contacting stage of claim 4, wherein said downcomer and demister rows provide a co-current contacting module of said contacting stage.

6. The contacting stage of claim 1, wherein said connecting flanges are aligned with said adjacent wall sections of said downcomer at an angle with respect to said inlet surfaces of said pair of demisters.

7. The contacting stage of claim 1, wherein said connecting flanges are bent upwardly from imperforate top plates of said demister units.

8. The contacting stage of claim 1, further comprising a plurality of fasteners extending through (A) opposite sides of said connecting angles and (B) said upper portions of said connecting flanges of said demister units and said adjacent wall sections of said downcomer, wherein said upper portions are disposed between said opposite sides.

9. The contacting stage of claim 8, wherein said plurality of fasteners are welded onto said opposite sides of said connecting angles or are pressure set.

10. The contacting stage of claim 8, wherein said plurality of fasteners are pressure set and extend through L-shaped openings in (A) and (B).

11. The contacting stage of claim 1, wherein at least a portion of said demister units have interconnecting side plates for securing adjacent, abutting side plates of said demister units in said demister rows.

12. The contacting stage of claim 11, wherein said adjacent, abutting side plates are male and female interconnecting side plates.

13. The contacting stage of claim 11, wherein said downcomer has opposite side ends with connections for securing side plates of demister units at each end of said demister row.

14. The contacting stage of claim 13, wherein said opposite side ends have female pockets that interconnect with male interconnecting side plates of said demister units at each end of said demister row.

15. The contacting stage of claim 1, further comprising support angles extending below bottom surfaces of said demister units.

16. The contacting stage of claim 15, wherein said support angles allow, during installation of said demister units, pivoting of said demister units from a vertical orientation to a non-vertical design orientation in which a mechanical seal is formed between said support angles and vertically extending lips of said receiving pans.

17. An apparatus for performing co-current vapor-liquid contacting, the apparatus comprising the contacting stage of claim 1, wherein each of said separate receiving pans has at least one duct, with each duct of one receiving pan providing fluid communication to a separate downcomer of an inferior stage; and wherein said contacting stage is in non-parallel alignment with respect to said inferior stage.

18. An apparatus for performing co-current vapor-liquid contacting, comprising:
   a contacting stage comprising:
   a) at least one downcomer having an outlet proximate at least one co-current flow channel;
   b) at least one demister row comprising a plurality of demister units having (i) inlet surfaces proximate said co-current flow channel and outlet surfaces superior to a receiving pan, and (ii) connecting flanges extending above top surfaces of said demister units;
   c) connecting angles extending over and covering (i) upper portions of said connecting flanges of said demister units and (ii) adjacent wall sections of said downcomer, thereby securing top sections of said demister units to a wall of said downcomer,
   d) at least one duct having an upper end in fluid communication with said receiving pan, and a lower end, wherein said lower end of each duct is in fluid communication with a separate downcomer of an inferior stage; and
   wherein said contacting stage is rotated with respect to an inferior stage of said apparatus.

19. The apparatus of claim 18, wherein two demister rows and said downcomer spaced therebetween provide a co-current contacting module of said contacting stage.

20. A method for contacting vapor and liquid streams, the method comprising passing the streams through the co-current flow channel of the apparatus of claim 18.

* * * * *